United States Patent
Hronek et al.

(10) Patent No.: US 7,640,031 B2
(45) Date of Patent: Dec. 29, 2009

(54) MOBILE ORIGINATED INTERACTIVE MENUS VIA SHORT MESSAGING SERVICES

(75) Inventors: Daniel Hronek, Annapolis, MD (US); Erik Wallace, Annapolis, MD (US); Phillip Geil, Clarksville, MD (US); Tom McCormick, Annapolis, MD (US); Walter Weichselbaumer, Annapolis, MD (US); Orville Pike, Annapolis, MD (US); Mark Titus, Arnold, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 105 days.

(21) Appl. No.: 11/472,307

(22) Filed: Jun. 22, 2006

(65) Prior Publication Data

US 2007/0298819 A1    Dec. 27, 2007

(51) Int. Cl.
*H04L 29/06* (2006.01)
(52) U.S. Cl. .................. 455/466; 370/352; 379/207.11
(58) Field of Classification Search ................. 455/466; 370/352; 379/207.11
See application file for complete search history.

(56) References Cited

U.S. PATENT DOCUMENTS

| | | |
|---|---|---|
| 1,103,073 A | 7/1914 | O'Connel |
| 3,920,908 A | 11/1975 | Kraus |
| 4,310,726 A | 1/1982 | Asmuth |
| 4,399,330 A | 8/1983 | Kuenzel |
| 4,494,119 A | 1/1985 | Wimbush |
| 4,651,156 A | 3/1987 | Martinez |
| 4,680,785 A | 7/1987 | Akiyama et al. |
| 4,706,275 A | 11/1987 | Kamil |
| 4,725,719 A | 2/1988 | Oncken et al. |
| 4,756,020 A | 7/1988 | Fodale |
| 4,776,000 A | 10/1988 | Parienti |
| 4,776,003 A | 10/1988 | Harris |
| 4,776,037 A | 10/1988 | Rozanski, Jr. |

(Continued)

FOREIGN PATENT DOCUMENTS

GB    2308528    6/1997

(Continued)

OTHER PUBLICATIONS

PCT International Search Report (PCTUS2007/16138) and Written Opinion of International Searching Authority, Feb. 7, 2008.

(Continued)

*Primary Examiner*—William D Cumming
(74) *Attorney, Agent, or Firm*—William H. Bollman

(57) ABSTRACT

Two-way interactive short message system with personalized messaging menus that provide WAP like services at less cost than CSD. Mobile Originated Interactive Menus are implemented as a feature of a Short Message Service Center (SMSC). Each option guides either to the next menu level, or to a final action to be executed according to the path followed by the subscriber. Importantly, the mobile originated interactive menus use SMS communications instead of circuit switched data (CSD) (e.g., instead of WAP communications), thus leaving traffic channels available for voice calls. Users may define the content and frequency they want. Replacement of messages in TDMA and GSM mobile devices allow for heavy usage without filling up the user's phone buffer, i.e., prior messages may be overwritten, to assure that only the latest information is all that is being displayed and read.

21 Claims, 6 Drawing Sheets

U.S. PATENT DOCUMENTS

| | | |
|---|---|---|
| 4,831,647 A | 5/1989 | D'Avello et al. |
| 4,852,149 A | 7/1989 | Zwick et al. |
| 4,852,155 A | 7/1989 | Barraud |
| 4,860,341 A | 8/1989 | D'Avello et al. |
| 4,891,638 A | 1/1990 | Davis |
| 4,891,650 A | 1/1990 | Sheffer |
| 4,901,340 A | 2/1990 | Parker et al. |
| 4,935,956 A | 6/1990 | Hellwarth et al. |
| 4,952,928 A | 8/1990 | Carroll et al. |
| 5,003,585 A | 3/1991 | Richer |
| 5,014,206 A | 5/1991 | Scribner et al. |
| 5,043,736 A | 8/1991 | Darnell et al. |
| 5,046,088 A | 9/1991 | Margulies |
| 5,055,851 A | 10/1991 | Sheffer |
| 5,063,588 A | 11/1991 | Patsiokas et al. |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori et al. |
| 5,103,449 A | 4/1992 | Jolissaint |
| 5,119,104 A | 6/1992 | Heller |
| 5,127,040 A | 6/1992 | D'Avello et al. |
| 5,128,938 A | 7/1992 | Borras |
| 5,138,648 A | 8/1992 | Palomeque et al. |
| 5,138,650 A | 8/1992 | Stahl et al. |
| 5,144,283 A | 9/1992 | Arens et al. |
| 5,144,649 A | 9/1992 | Zicker et al. |
| 5,150,113 A | 9/1992 | Bluthgen et al. |
| 5,159,625 A | 10/1992 | Zicker |
| 5,161,180 A | 11/1992 | Chavous |
| 5,177,478 A | 1/1993 | Wagai et al. |
| 5,187,710 A | 2/1993 | Chau et al. |
| 5,193,215 A | 3/1993 | Olmer |
| 5,208,756 A | 5/1993 | Song |
| 5,214,789 A | 5/1993 | George et al. |
| 5,216,703 A | 6/1993 | Roy |
| 5,218,367 A | 6/1993 | Sheffer et al. |
| 5,220,593 A | 6/1993 | Zicker et al. |
| 5,223,844 A | 6/1993 | Mansell et al. |
| 5,233,642 A | 8/1993 | Renton |
| 5,235,630 A | 8/1993 | Moodey et al. |
| 5,239,570 A | 8/1993 | Koster et al. |
| 5,265,155 A | 11/1993 | Castro |
| 5,266,944 A | 11/1993 | Carroll et al. |
| 5,274,802 A | 12/1993 | Altine |
| 5,276,444 A | 1/1994 | McNair |
| 5,289,527 A | 2/1994 | Tiedemann, Jr. |
| 5,291,543 A | 3/1994 | Freese et al. |
| 5,293,642 A | 3/1994 | Lo |
| 5,297,189 A | 3/1994 | Chabernaud |
| 5,299,132 A | 3/1994 | Wortham |
| 5,301,223 A | 4/1994 | Amadon et al. |
| 5,301,234 A | 4/1994 | Mazziotto et al. |
| 5,309,501 A | 5/1994 | Kozik et al. |
| 5,311,572 A | 5/1994 | Friedes et al. |
| 5,321,735 A | 6/1994 | Breeden et al. |
| 5,325,302 A | 6/1994 | Izidon et al. |
| 5,325,418 A | 6/1994 | McGregor et al. |
| 5,327,144 A | 7/1994 | Stilp et al. |
| 5,329,578 A | 7/1994 | Brennan et al. |
| 5,334,974 A | 8/1994 | Simms et al. |
| 5,339,352 A | 8/1994 | Armstrong et al. |
| 5,341,410 A | 8/1994 | Aron et al. |
| 5,341,414 A | 8/1994 | Popke |
| 5,343,493 A | 8/1994 | Karimullah |
| 5,347,568 A | 9/1994 | Moody et al. |
| 5,351,235 A | 9/1994 | Lahiten |
| 5,353,335 A | 10/1994 | D'Urso et al. |
| 5,359,182 A | 10/1994 | Schilling |
| 5,359,642 A | 10/1994 | Castro |
| 5,359,643 A | 10/1994 | Gammino |
| 5,361,212 A | 11/1994 | Class et al. |
| 5,363,425 A | 11/1994 | Mufti et al. |
| 5,369,699 A | 11/1994 | Page et al. |
| 5,374,936 A | 12/1994 | Feng |
| 5,379,451 A | 1/1995 | Nakagoshi et al. |
| 5,381,338 A | 1/1995 | Wysocki et al. |
| 5,384,825 A | 1/1995 | Dillard et al. |
| 5,387,993 A | 2/1995 | Heller et al. |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,396,545 A | 3/1995 | Nair et al. |
| 5,396,558 A | 3/1995 | Ishiguro et al. |
| 5,398,190 A | 3/1995 | Wortham |
| 5,404,580 A | 4/1995 | Simpson et al. |
| 5,406,614 A | 4/1995 | Hara |
| 5,408,513 A | 4/1995 | Busch, Jr. et al. |
| 5,408,519 A | 4/1995 | Pierce et al. |
| 5,408,682 A | 4/1995 | Ranner et al. |
| 5,412,726 A | 5/1995 | Nevoux et al. |
| 5,418,537 A | 5/1995 | Bird |
| 5,423,076 A | 6/1995 | Westergreen et al. |
| 5,430,759 A | 7/1995 | Yokev et al. |
| 5,432,841 A | 7/1995 | Rimer |
| 5,434,789 A | 7/1995 | Fraker et al. |
| 5,438,615 A | 8/1995 | Moen |
| 5,440,621 A | 8/1995 | Castro |
| 5,454,024 A | 9/1995 | Lebowitz |
| 5,457,737 A | 10/1995 | Wen |
| 5,461,390 A | 10/1995 | Hoshen |
| 5,465,289 A | 11/1995 | Kennedy, Jr. |
| 5,469,497 A | 11/1995 | Pierce et al. |
| 5,470,233 A | 11/1995 | Fruchterman et al. |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer et al. |
| 5,485,505 A | 1/1996 | Norman et al. |
| 5,488,563 A | 1/1996 | Chazelle et al. |
| 5,497,149 A | 3/1996 | Fast |
| 5,502,761 A | 3/1996 | Duncan et al. |
| 5,506,313 A | 4/1996 | Allen et al. |
| 5,506,893 A | 4/1996 | Buscher et al. |
| 5,508,931 A | 4/1996 | Snider |
| 5,509,056 A | 4/1996 | Ericsson et al. |
| 5,513,243 A | 4/1996 | Kage |
| 5,515,287 A | 5/1996 | Hakoyama et al. |
| 5,517,555 A | 5/1996 | Amadon et al. |
| 5,517,559 A | 5/1996 | Hayashi et al. |
| 5,519,403 A | 5/1996 | Bickley et al. |
| 5,532,690 A | 7/1996 | Hertel |
| 5,535,434 A | 7/1996 | Siddoway et al. |
| 5,539,398 A | 7/1996 | Hall et al. |
| 5,543,776 A | 8/1996 | L'esperance et al. |
| 5,550,897 A | 8/1996 | Seiderman |
| 5,552,772 A | 9/1996 | Janky et al. |
| 5,555,286 A | 9/1996 | Tendler |
| 5,568,119 A | 10/1996 | Schipper et al. |
| 5,570,416 A | 10/1996 | Kroll |
| 5,574,648 A | 11/1996 | Pilley |
| 5,577,100 A | 11/1996 | McGregor et al. |
| 5,579,372 A | 11/1996 | Astrom |
| 5,579,376 A | 11/1996 | Kennedy, III et al. |
| 5,583,918 A | 12/1996 | Nakagawa |
| 5,586,175 A | 12/1996 | Hogan et al. |
| 5,588,009 A | 12/1996 | Will |
| 5,592,535 A | 1/1997 | Klotz |
| 5,604,486 A | 2/1997 | Lauro et al. |
| 5,606,850 A | 3/1997 | Nakamura |
| 5,610,815 A | 3/1997 | Gudat et al. |
| 5,610,972 A | 3/1997 | Emery et al. |
| 5,614,890 A | 3/1997 | Fox |

| Patent Number | Date | Inventor |
|---|---|---|
| 5,615,116 A | 3/1997 | Gudat et al. |
| 5,621,793 A | 4/1997 | Bednarek et al. |
| 5,625,669 A | 4/1997 | McGregor et al. |
| 5,628,051 A | 5/1997 | Salin |
| 5,633,912 A | 5/1997 | Tsoi |
| 5,640,447 A | 6/1997 | Fonseca |
| 5,673,306 A | 9/1997 | Amadon et al. |
| 5,682,600 A | 10/1997 | Salin |
| 5,692,037 A | 11/1997 | Friend |
| 5,722,067 A | 2/1998 | Fougnies et al. |
| 5,732,346 A | 3/1998 | Lazaridis et al. |
| 5,740,534 A | 4/1998 | Ayerst et al. |
| 5,761,618 A | 6/1998 | Lynch et al. |
| 5,767,795 A | 6/1998 | Schaphorst |
| 5,768,509 A | 6/1998 | Gunluk |
| 5,774,533 A | 6/1998 | Patel |
| 5,778,313 A | 7/1998 | Fougnies |
| 5,787,357 A | 7/1998 | Salin |
| 5,790,636 A | 8/1998 | Marshall |
| 5,793,859 A | 8/1998 | Matthews |
| 5,794,142 A | 8/1998 | Vantilla et al. |
| 5,797,091 A | 8/1998 | Clise et al. |
| 5,797,094 A | 8/1998 | Houde et al. |
| 5,797,096 A | 8/1998 | Lupien et al. |
| 5,802,492 A | 9/1998 | DeLorme et al. |
| 5,806,000 A | 9/1998 | Vo et al. |
| 5,815,816 A | 9/1998 | Isumi |
| 5,822,700 A | 10/1998 | Hult et al. |
| 5,825,283 A | 10/1998 | Camhi |
| 5,826,185 A | 10/1998 | Wise et al. |
| 5,828,740 A | 10/1998 | Khuc et al. |
| 5,850,599 A | 12/1998 | Seiderman |
| 5,854,975 A | 12/1998 | Fougnies et al. |
| 5,905,736 A | 5/1999 | Rohen et al. |
| 5,920,821 A | 7/1999 | Seazholtz et al. |
| 5,930,701 A | 7/1999 | Skog |
| 5,943,399 A | 8/1999 | Bannister et al. |
| 5,946,629 A | 8/1999 | Sawyer et al. |
| 5,946,630 A | 8/1999 | Willars et al. |
| 5,950,130 A | 9/1999 | Coursey |
| 5,953,398 A | 9/1999 | Hill |
| 5,974,054 A | 10/1999 | Couts et al. |
| 5,978,685 A | 11/1999 | Laiho |
| 5,987,323 A | 11/1999 | Huotari |
| 5,999,811 A | 12/1999 | Molne |
| 6,035,025 A | 3/2000 | Hanson |
| 6,049,710 A | 4/2000 | Nilsson |
| 6,058,300 A | 5/2000 | Hanson |
| 6,064,875 A | 5/2000 | Morgan |
| 6,070,067 A | 5/2000 | Nguyen et al. |
| 6,073,004 A | 6/2000 | Balachandran |
| 6,073,015 A | 6/2000 | Berggren |
| 6,075,982 A | 6/2000 | Donovan et al. |
| 6,081,508 A | 6/2000 | West et al. |
| 6,101,378 A | 8/2000 | Barabash et al. |
| 6,122,503 A | 9/2000 | Daly |
| 6,122,520 A | 9/2000 | Want et al. |
| 6,148,197 A | 11/2000 | Bridges et al. |
| 6,148,198 A | 11/2000 | Anderson et al. |
| 6,149,353 A | 11/2000 | Nilsson |
| 6,157,831 A | 12/2000 | Lamb |
| 6,169,891 B1 | 1/2001 | Gorham et al. |
| 6,173,181 B1 | 1/2001 | Losh |
| 6,181,935 B1 | 1/2001 | Gossman et al. |
| 6,188,752 B1 | 2/2001 | Lesly |
| 6,192,241 B1 | 2/2001 | Yu et al. |
| 6,195,543 B1 | 2/2001 | Granberg |
| 6,198,431 B1 | 3/2001 | Gibson |
| 6,199,045 B1 | 3/2001 | Giniger et al. |
| 6,205,330 B1 | 3/2001 | Winbladh |
| 6,208,854 B1 | 3/2001 | Roberts et al. |
| 6,223,046 B1 | 4/2001 | Hamill-Keays et al. |
| 6,226,529 B1 | 5/2001 | Bruno et al. |
| 6,249,680 B1 | 6/2001 | Wax et al. |
| 6,249,744 B1 | 6/2001 | Morita |
| 6,266,614 B1 | 7/2001 | Alumbaugh |
| 6,289,373 B1 | 9/2001 | Dezonno |
| 6,317,594 B1 | 11/2001 | Gossman et al. |
| 6,327,479 B1 | 12/2001 | Mikkola |
| 6,335,968 B1 | 1/2002 | Malik |
| 6,356,630 B1 | 3/2002 | Cai et al. |
| 6,373,930 B1 | 4/2002 | McConnell et al. |
| 6,381,316 B2 | 4/2002 | Joyce et al. |
| 6,393,269 B1 | 5/2002 | Hartmaier et al. |
| 6,396,913 B1 | 5/2002 | Perkins et al. |
| 6,397,055 B1 | 5/2002 | McHenry et al. |
| 6,442,257 B1 | 8/2002 | Gundlach |
| 6,456,852 B2 | 9/2002 | Bar et al. |
| 6,483,907 B1 | 11/2002 | Wong et al. |
| 6,490,450 B1 | 12/2002 | Batni et al. |
| 6,526,335 B1 | 2/2003 | Treyz et al. |
| 6,529,593 B2 | 3/2003 | Nelson |
| 6,529,732 B1 | 3/2003 | Vainiomaki et al. |
| 6,587,688 B1 | 7/2003 | Chambers et al. |
| 6,728,353 B1 | 4/2004 | Espejo et al. |
| 6,731,943 B1 | 5/2004 | McCormick |
| 6,868,074 B1 | 3/2005 | Hanson |
| 6,961,330 B1 * | 11/2005 | Cattan et al. ................ 370/352 |
| 6,993,325 B1 | 1/2006 | Waesterlid |
| 7,106,845 B1 * | 9/2006 | Zhuk et al. ............. 379/207.11 |
| 7,127,264 B2 * | 10/2006 | Hronek et al. ............... 455/466 |
| 7,130,383 B2 | 10/2006 | Naidoo et al. |
| 7,180,415 B2 | 2/2007 | Banker et al. |
| 7,245,216 B2 | 7/2007 | Burkley |
| 7,317,705 B2 | 1/2008 | Hanson |
| 7,386,588 B2 | 6/2008 | Mousseau |
| 2001/0040949 A1 | 11/2001 | Blonder et al. |
| 2002/0103762 A1 | 8/2002 | Lopez |
| 2002/0116263 A1 | 8/2002 | Gouge et al. |
| 2002/0118800 A1 | 8/2002 | Martinez et al. |
| 2002/0119793 A1 * | 8/2002 | Hronek et al. ............... 455/466 |
| 2002/0168986 A1 | 11/2002 | Lau et al. |
| 2003/0058096 A1 | 3/2003 | Shteyn |
| 2003/0060212 A1 | 3/2003 | Thomas |
| 2004/0103431 A1 | 5/2004 | Davenport et al. |
| 2004/0199614 A1 | 10/2004 | Shenfield et al. |
| 2004/0203900 A1 | 10/2004 | Cedarvall et al. |
| 2005/0020287 A1 | 1/2005 | Pohutsky et al. |
| 2005/0048948 A1 | 3/2005 | Holland et al. |
| 2005/0071671 A1 | 3/2005 | Karaoguz |
| 2005/0135569 A1 | 6/2005 | Dickinson et al. |
| 2005/0149430 A1 | 7/2005 | Williams |
| 2005/0277432 A1 | 12/2005 | Viana et al. |
| 2005/0282518 A1 | 12/2005 | D'Evelyn |
| 2006/0058102 A1 | 3/2006 | Nguyen et al. |
| 2006/0109960 A1 | 5/2006 | D'Evelyn |
| 2006/0116138 A1 | 6/2006 | Simsek et al. |
| 2006/0183460 A1 | 8/2006 | Srinivasan et al. |
| 2007/0149208 A1 | 6/2007 | Syrbe |

FOREIGN PATENT DOCUMENTS

| | | |
|---|---|---|
| WO | WO9856160 | 12/1998 |
| WO | WO9960801 | 11/1999 |
| WO | WO0028746 | 5/2000 |

OTHER PUBLICATIONS

The Power of Mobile Unified Messaging: Siemans and Comverse to Demonstrate WAP-Based Messaging Applications on Live GPRS System, Comverse, Feb. 2000.

ETSI/3Gpp, $3^{rd}$ Generation Partnership Project; Technical Specification Group Services and System Aspects; General Packet Radio Service (GPRS); Service description; Stage 2; (3G TS 23.060 version 3.2.1), Jan. 2000, pp. 138-142.

ETSI,3GPP, $3^{rd}$ Generation Partnership Project; Technical Specification Group Core Network; Customized Applications for Mobile network Enhanced Logic; (CAMEL) Phase 3—Stage 2 (3G TS 23.078 version 3.3.0), Dec. 1999, pp. 300-329.

Bond, "Cellular Carriers Use Prepaid Programs to Reach Untapped Markets," Billing World, Mar. 1997, pp. 14-17.

Tecore, Inc., "Pre-Paid Cellular," sales literature, Mar. 25, 1997, pp. 1-4.

PCT International Search Report (PCTUS2007/21133), Apr. 21, 2008.

PCT International Search Report (PCTUS2007/026132), Jun. 6, 2008.

* cited by examiner

MOBILE ORIGINATED INTERACTIVE MENUS VIA SHORT MESSAGING SERVICES

The present application claims priority from U.S. patent application Ser. No. 09/793,089, entitled "MOBILE ORIGINATED INTERACTING MENUS VIA SHORT MESSAGING SERVICES," filed on Feb. 27, 2001, the entirety of which is explicitly incorporated herein by reference.

BACKGROUND OF THE INVENTION

1. Field of the Invention

This invention relates generally to wireless communications networks. More particularly, it relates to the communication of menus between a mobile (i.e., wireless) device and an application server via a short message service center (SMSC).

2. Background of Related Art

Wireless communication services are in increasing demand in response to a society that is becoming increasingly mobile. In the early 1990s, as a result of the growing popularity of digital wireless technology, a standard for digital wireless networks was introduced in Europe. That standard, now known as the global standard for mobiles (GSM), included a service called short messaging service (SMS). An SMS system allows transmission of short messages, typically up to 160 characters, to and from communication devices, e.g., cellular telephone handsets, telephones or computers with appropriate modems. In North America, the SMS is currently implemented on digital wireless/mobile networks, such as a PCS network based on the GSM standard, code division multiple access (CDMA) and/or time division multiple access (TDMA) methods. Short message services are gaining in popularity, particularly in the United States.

Short message services are advantageous over text based paging services because of the capability of bi-directional communication. Such bi-directional communication allows, for example, notification to the originating device of the success or failure of the short message delivery.

Each SMS network typically includes a short message service center (SMSC) which acts as a store-and-forward mechanism providing guaranteed delivery of short messages to a subscriber, even if the subscriber is inactive when the message was transmitted, by delivering the short messages once the subscriber becomes active. Delivery of all short messages is guaranteed regardless of whether or not the intended subscriber is "on-line" because the transmitted short message is stored within the SMS network and delivered to the intended subscriber from their assigned SMSC when the subscriber becomes available.

A variety of services have been introduced using SMS networks including, for example, integrated electronic mail and fax, integrated paging, interactive banking, and information services such as stock quotes and airline schedule delivery.

In operation, an SMSC receives a short message from any source and intended to be delivered to a particular subscriber. When the intended subscriber is not available because, for example, it is turned off or is outside of the service area of the SMS network, the attempt to deliver the short message at that time will fail. In this case, the short message will be retained in the SMS network for a later delivery attempt. Thereafter, when the subscriber finally becomes available, e.g., is turned on or has moved into the service area of the SMS network, the relevant portions of the network (e.g., the mobile servicing center (MSC) and the home location register (HLR)) notify the SMSC to initiate delivery of the stored (i.e., previously failed) short messages.

FIG. 5 shows an exemplary structure of a SMS network 500. Although the following example is described using terms and protocols mainly as defined by the North American standard IS-41, it will be apparent to one skilled in the art that the example is applicable to any networks that offer store-and-forward type short message service.

The SMS network 500 typically includes one short message service center (SMSC) 501. The SMSC 501 typically includes a storage subsystem to store short messages that had failed to be delivered. The SMSC 501 typically further includes various interfaces (not shown) to receive short messages originating from various sources and protocols, such as a Voice Mail System (VMS) 508, paging networks using, e.g., Telocator Numeric Paging Protocol (TNPP) 509, devices using the Short Message Peer-to-Peer (SMPP) protocol 510 via TCP/IP, e-mail systems using the Simple Mail Transport Protocol (SMTP) 511, and/or devices using the Telocator Alphanumeric Protocol (TAP) 512. Some of the various sources of the short messages may be gateways to other networks.

The SMSC 501 may further include a gateway/interworking block (not shown) that enables the SMSC 501 to communicate with the rest of the SMS network 500, such as a Home Location Register (HLR) 503 or a Mobile Switching Center (MSC) 505, using the Signaling System No. 7 (SS7) 502. The methods and mechanism of communication in the SMS network 500 are defined by the mobile application part (MAP) layer, which uses the services of the SS7 transaction capabilities application part (TCAP) as the signaling infrastructure of the SMS network 500. The protocol for the signaling is referred to as the IS-41 protocol under the American standard as published by the Telecommunication Industry Association (TIA) or as the GSM MAP under the European standard published by European Telecommunication Standards Institute (ETSI).

The Home Location Register (HLR) 503 includes a database that permanently stores and manages subscriptions and service profiles of users having a subscription to the SMS network 500. Although only one HLR 503 is shown, the SMS network 500 may include two or more HLRs. The SMS network 500 also typically includes several visitor location registers (VLR) 504. A VLR 504 is a database temporarily holding information about visiting subscribers who move into its service area. Thus, a VLR 504 contains information regarding routing information for all subscribers within its service area, and informs the relevant HLR 503 of the availability and routing information regarding its subscribers. The mobile switching center (MSC) 505 obtains subscriber information from the VLR 504 to service visiting subscribers.

The mobile switching center (MSC) 505 performs switching and call control functions, and receives short messages from the SMSC 501 for delivery to the appropriate mobile subscriber 507 (shown, e.g., as a cellular phone handset). It is to be understood that, although only one MSC 505 is shown, the wireless network 500 may include two or more MSCs.

The base station subsystem (BSS) 506 handles the wireless communications, e.g., RF transmission and reception of voice and data traffic, to and from the mobile subscriber 507. The BSS 506 is typically composed mainly of two parts: the base transceiver station (BTS, not shown) which houses the radio transceivers that define a cell and handles the radio-link protocols with the mobile subscriber 507, and the base station controller (BSC, also not shown) which manages the radio resources, and handles radio channel set up, frequency hopping, and handoffs (or handovers as is sometimes referred as). The BSC is the interface between the MSC 505 and the subscriber 507. The subscriber 507, also sometimes referred to as a mobile station (MS), typically consists of mobile equipment (e.g., a cellular phone handset) preferably uniquely identifiable by an identifying number, e.g., mobile identification number (MIN), International mobile subscriber identification (IMSI) and/or electronic serial number (ESN), for the subscriber 507. The mobile equipment may include a storage area, e.g., a flash memory, a ROM, a RAM or the like to hold the unique identifying number within the mobile equipment. In GSM networks, a smart card, typically referred to as a subscriber identity module (SIM) is utilized to store a unique identifying number.

FIG. 6 shows an exemplary flow of a short message through a conventional SMS network. Although FIG. 6 shows only an example of short message delivery to a mobile subscriber, it is to be understood that a mobile subscriber or any other sources may originate a short message. The flow of a mobile subscriber originated short message would involve similar processes as the following mobile subscriber terminated short message example, and would be apparent to one of ordinary skill in the art.

The SMSC 601 receives a short message 606 intended for a subscriber 604 from a source of short message 605 which may be any one or more of the aforementioned sources of short messages, e.g., 508-512 of FIG. 5. Upon receiving a short message, the SMSC 601 sends a request for routing information, i.e., an SMS request (SMSREQ), to the HLR 602. The HLR 602 maintains information regarding the availability of the intended subscriber 604 and the appropriate MSC 603 that services the intended subscriber, and sends the information as routing information 608 back to the SMSC 601. The SMSC 601 forwards 609 the short message to the appropriate MSC 603 using the routing information 608 received from the HLR 602, for example, in accordance with the short message delivery point-to-point (SMDPP) mechanism of IS-41 standard. The MSC 603 queries the VLR (not shown) for subscriber information. The VLR may perform a paging and authentication process 610, and sends the subscriber information to the MSC 603. The MSC 603, using the information received from the VLR, delivers the short message 611 to the intended subscriber 604, and sends a delivery report 612 to the SMSC 601. The SMSC 601 may send the result of the delivery, i.e., the status report 613, to the source of the short message 605 if requested.

When the attempted delivery of the short message has failed because, for instance, the intended user was out of the service area, or had his or her communication device turned off, the MSC 603 informs the HLR 602 of the failure. The HLR 602 then turns on an SMS notification indicator flag for the subscriber, and the SMSC 601 retains the failed message for a later delivery attempt.

Wireless solutions to date have allowed a subscriber to push data to the handset from a web site. The Wireless Application Protocol (WAP) attempts to standardize a mechanism for two-way communications. The use of WAP protocol communications requires that a special browser be loaded on the mobile device, and requires the user to enter into a dedicated 'browser mode' to interact with 2-way services.

WAP phones can query Internet sites. WAP is currently available only over Circuit Switched Data (CSD) networks, which utilize a calling channel. Also, it does not adequately utilize the existing data channels available.

WAP capable mobile devices rely on pushing data to a mobile device, or on pulling data. WAP services can also provide a menuing solution to mobile devices. However, such mobile devices must include WAP specific software, increasing costs and further complicating a wireless network.

Significantly, WAP technologies are available only via CSD or packet switched data (PSD) channels that occupy a call for the duration of the WAP session.

There is a need for a mobile wireless device that does not necessitate WAP capability in the mobile wireless device to implement interactive menuing by a wireless mobile device.

SUMMARY OF THE INVENTION

In accordance with the principles of the present invention, an interactive short messaging system menu selection process comprises receiving a text message from a mobile device including an identification of a main menu. A text message is transmitted to the mobile device including text of the main menu. A choice corresponding to a selected further menu is received back from the mobile device.

A method of transmitting selection of a lower level menu using text messaging in accordance with another aspect of the present invention comprises responding to a first menu displayed on a mobile device by overwriting at least one character of an address of the first menu, and transmitting the overwritten address to a short messaging system (SMS).

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides wireless carriers with a method and apparatus for providing 2-way interactive short message system menus to a handset. The menus can be setup as required by the service provider and can provide API linkage to external sites offering access to the Internet. This provides the ability to provide WAP like services at a fraction of the cost of CSD.

Mobile Originated Interactive Menus may be implemented as a feature of a Short Message Service Center (SMSC). This feature would allow service providers to configure several levels of menus with, e.g., up to 9 options per menu. Each option guides either to the next menu level, or to a final action to be executed according to the path followed by the subscriber.

Importantly, the mobile originated interactive menus use SMS communications instead of circuit switched data (CSD)

(e.g., instead of WAP communications), thus leaving traffic channels available for voice calls. Moreover, mobile originated mobile devices are less costly than are wireless application protocol (WAP) equipped mobile devices.

Interactive SMS Menus may be implemented as a feature in a Short Message Service Center (SMSC) and Internet Gateway for CDMA, TDMA, and/or GSM networks, and does not require WAP protocol communications. Interactive SMS menus allow service providers to offer their subscribers personalized messaging menus with multiple options for quick and easy access to Web-based content.

Users may define the content and frequency they want, whether it is a scheduled delivery or on-demand. The interactive SMS menu options offer customers a simple-to-use technique and apparatus for checking, e.g., stock quotes, local weather, and/or other Web-based news and information when they want it. The interactive nature of the service allows the wireless network to poll the user for their next response, with multiple menued options offered, making it highly intuitive. Replacement of messages in TDMA and GSM mobile devices allow for heavy usage without filling up the user's phone buffer, i.e., prior messages may be overwritten, to assure that only the latest information is all that is being displayed and read.

The flexibility of Interactive SMS Menus can allow service providers to define their own base offering of menus, depending upon their targeted customer segments.

Figure 1:
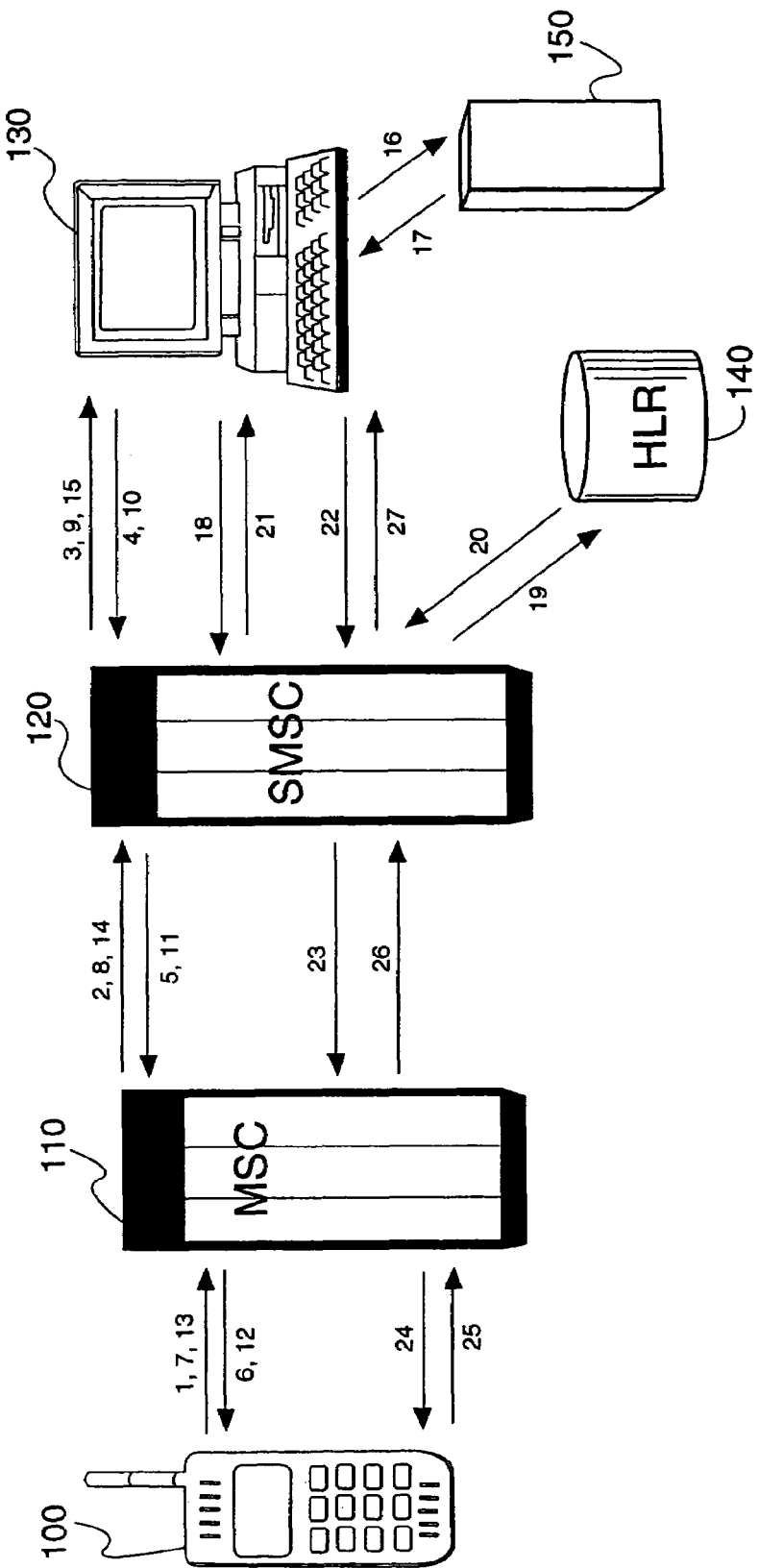
FIG. 1 illustrates an information query utilizing interactive SMS menus in a mobile device, in accordance with the principles of the present invention.

FIG. 1 illustrates an information query utilizing interactive SMS menus in a mobile device, in accordance with the principles of the present invention.

In particular, as shown in FIG. 1, message flows 1-6 show a menu request by a subscriber using a mobile device 100, and receipt of a main (or 'root') menu from an appropriate Web gateway 130 via an SMSC 120 and MSC 110. In the given example of FIG. 1, the mobile device 100 is the originating station, anointing this scenario as a 'mobile originated' (MO) scenario.

Message flows 7-12 show the mobile device 100 continuing to navigate down through levels of menus rooted by the originally received main menu by selection using the numeric keypad of the mobile device 100.

Message flows 13-15 show the user or subscriber of the mobile device 100 ultimately reaching and making their final selection from a particular menu page.

Message flows 16 and 17 show an application such as QUERYNET™ running on an appropriate Web gateway 130 executing a query to an available information server 150 on the Internet, and receiving a result. The Web gateway 130 is preferably a wireless Internet gateway including an appropriate network information server application such as QUERYNET™ available from TeleCommunication Systems, Inc. in Annapolis, Md. The Web gateway 130 may communicate with an appropriate application running on the information server 150 using, e.g., an HTTP Post XML command.

Relevant portions of the QUERYNET™ application are shown and described in U.S. application Ser. No. 09/785,438, filed Feb. 20, 2001, entitled "Individualized Network Information Server", by Richard Smith, Johanna Wilson, and Steve Levine, the entirety of which is expressly incorporated herein by reference. Similarly, an appropriate Web gateway 130 is shown and described in U.S. application Ser. No. 09/630,762, filed Aug. 2, 2000, entitled "Wireless Internet Gateway", by Richard Smith, the entirety of which is expressly incorporated herein by reference.

Message flows 18-21 show the Web gateway 130 querying a home location register (HLR) 140 for the location of the mobile device 100, and receipt of the PC of the serving MSC 110.

Message flows 22-27 show that, after formatting of the result, the Web gateway 130 returns the requested information to the mobile device 100, and receives an acknowledgement.

Figure 2:
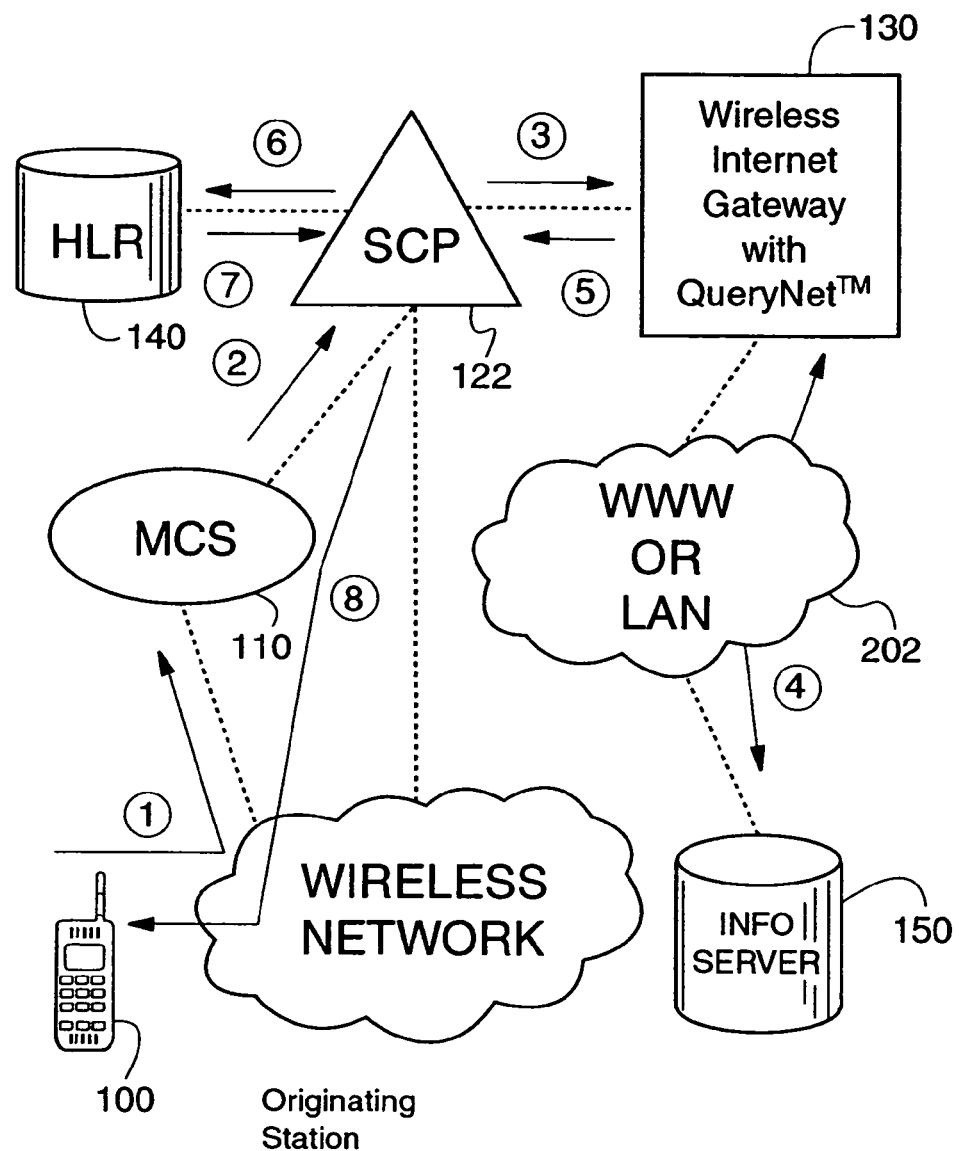
FIG. 2 an exemplary message flow providing interactive SMS menus to a mobile device, in accordance with the principles of the present invention.

FIG. 2 an exemplary message flow providing interactive SMS menus to a mobile device, in accordance with the principles of the present invention.

In particular, as shown in FIG. 2, a wireless network service provider may provision a menu structure in accordance with their own service offerings. The main menu preferably includes one or more subsisting menus selected from that main menu.

Process step 1 in FIG. 2 depicts the user of the mobile device 100 navigating down through levels of menus by selection of an 'option' provided by a preceding menu.

Step 2 and Step 3 show that upon selection of a final action, the SMSC 120 at a switching control point (SCP) 122 scales the final action request to the appropriate external entity (e.g., to the Wireless Internet Gateway 130).

Step 4 of FIG. 2 shows the submission of a query by the Wireless Internet Gateway 130 to the appropriate Information Server 150 via the Internet 202, and the receipt of an appropriate result.

Step 5 shows the Wireless Internet Gateway 130 forwarding a short message (or messages) containing the result of the query to the SMSC 120. The short message is addressed to the mobile device 100 that initiated the query.

Step 6 shows the SMSC 120 querying the HLR 140.

Step 7 shows the HLR 140 responding with MSC point code.

Step 8 shows the SMSC 120 submitting a message to the MSC 110 for delivery to the mobile device 100.

Simple applications may utilize the interactive SMS menus to provide static network information, such as emergency numbers, Short Dial numbers, or useful service provider contact information (e.g., billing questions or service frequently asked questions).

More powerful applications can seek out content information from external sources via a Wireless Internet Gateway or to conduct transactions via the Web. For instance, an exemplary application may allow the submission of a command to an external entity that returns a desired result. A potential scenario may involve a subscriber navigating through a couple of menus to reach a "Stock Quotes" option, and then entering the stock ticker of a desired stock.

Figure 3A:
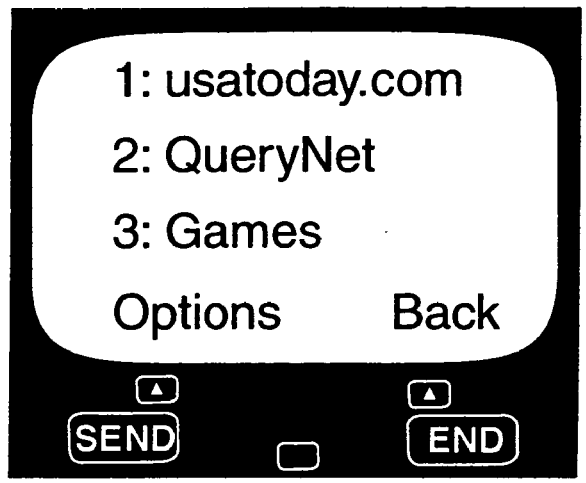
FIGS. 3A to 3C show exemplary interactive SMS menus displayed on a mobile phone, in accordance with the principles of the present invention.
Figure 3B:
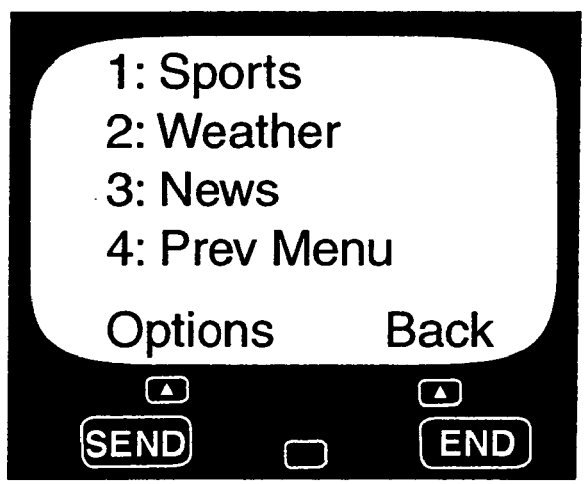
Figure 3C:

FIGS. 3A to 3C show exemplary interactive SMS menus displayed on a mobile phone, in accordance with the principles of the present invention.

In particular, FIG. 3A shows a main menu custom configured by and for a particular subscriber. In particular, the subscriber accesses a static main menu from the SMSC 120 containing the text: "1: USAToday.com 2: QueryNet 3: Games Options Back".

If the subscriber were to choose '1' in response to the main menu shown in FIG. 3A, another static menu one level down is shown in FIG. 3B, including the sub-menus of the USAToday.com. In particular, the $2^{nd}$ level of menu for the main menu choice of '1' includes the text: "1: Sports 2: Weather 3: News 4: Prev Menu Options Back".

FIG. 3C shows an exemplary dynamic menu obtained from the information server 150 for the USAToday.com via the Wireless Internet Gateway 130, including the text: "Ripken set to rebound after frustrating 1999 Orioles 3B says Options Back".

As shown in FIGS. 3A to 3C, the menu structures and/or content are preferably service provider configurable (and even subscriber customized). Moreover, the interactive SMS menus are delivered to the mobile device 100 via SMS short messaging, not using, e.g., WAP protocols. It is preferable that an appropriate number of menu levels be supported, e.g., up to five (5), but the present invention relates to two or more levels of menus. The interactive SMS menus enable navigation to access multiple services at the easy selection of a choice, i.e., with the selection of '1', '2', '3', '4', '5', '6', '7', '8', or '9' in response to the receipt of any relevant menu. In the given example, selection of a '0' takes you back to a home or root menu.

As shown in FIGS. 3A to 3C, the menus on the SMSC 120 are static in response to the mobile device 100, whereas the menus on the Wireless Internet Gateway 130 may be dynamic in that they are 'formed' by the response information provided by the relevant information server 150.

Figure 4A:
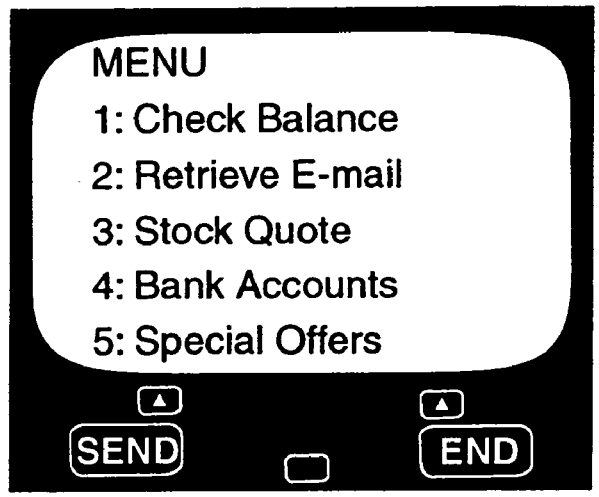
FIGS. 4A to 4C show an exemplary application of interactive SMS menus wherein on-demand stock updates are provided in response to selection from a lower level menu, in accordance with the principles of the present invention.
Figure 4B:
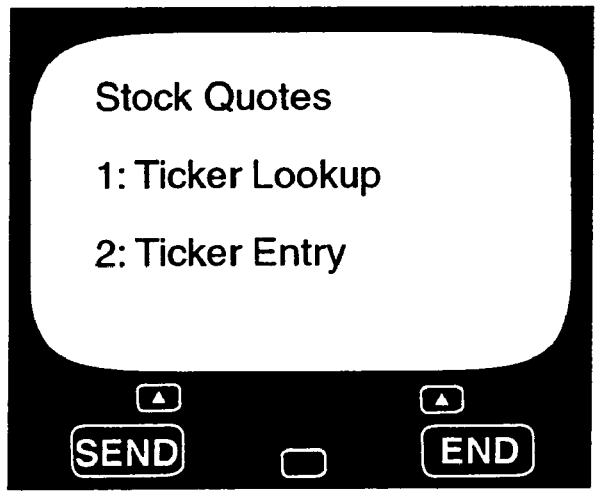
Figure 4C:
Figure 5:
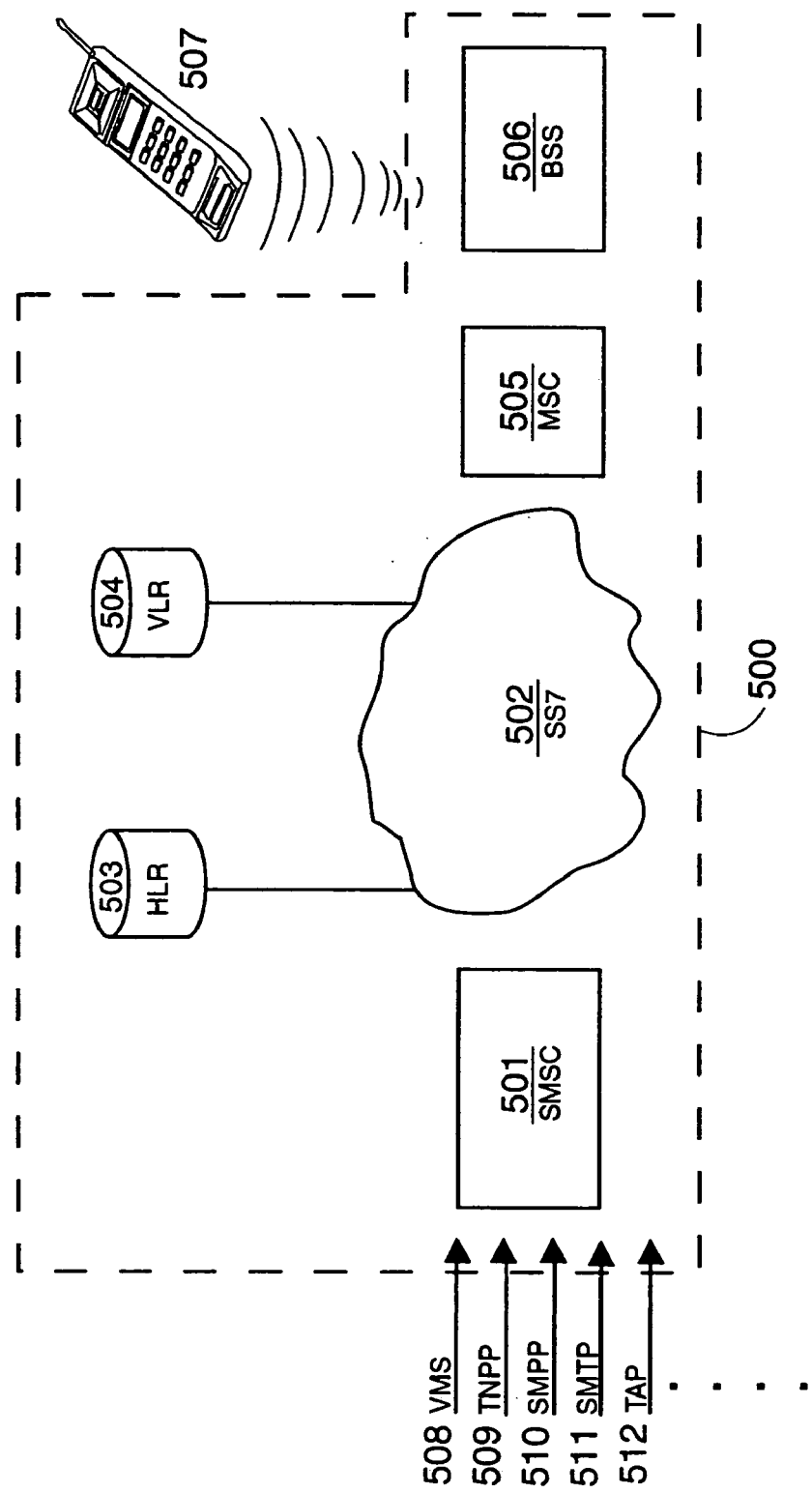
FIG. 5 shows an exemplary structure of a conventional SMS network.
Figure 6:
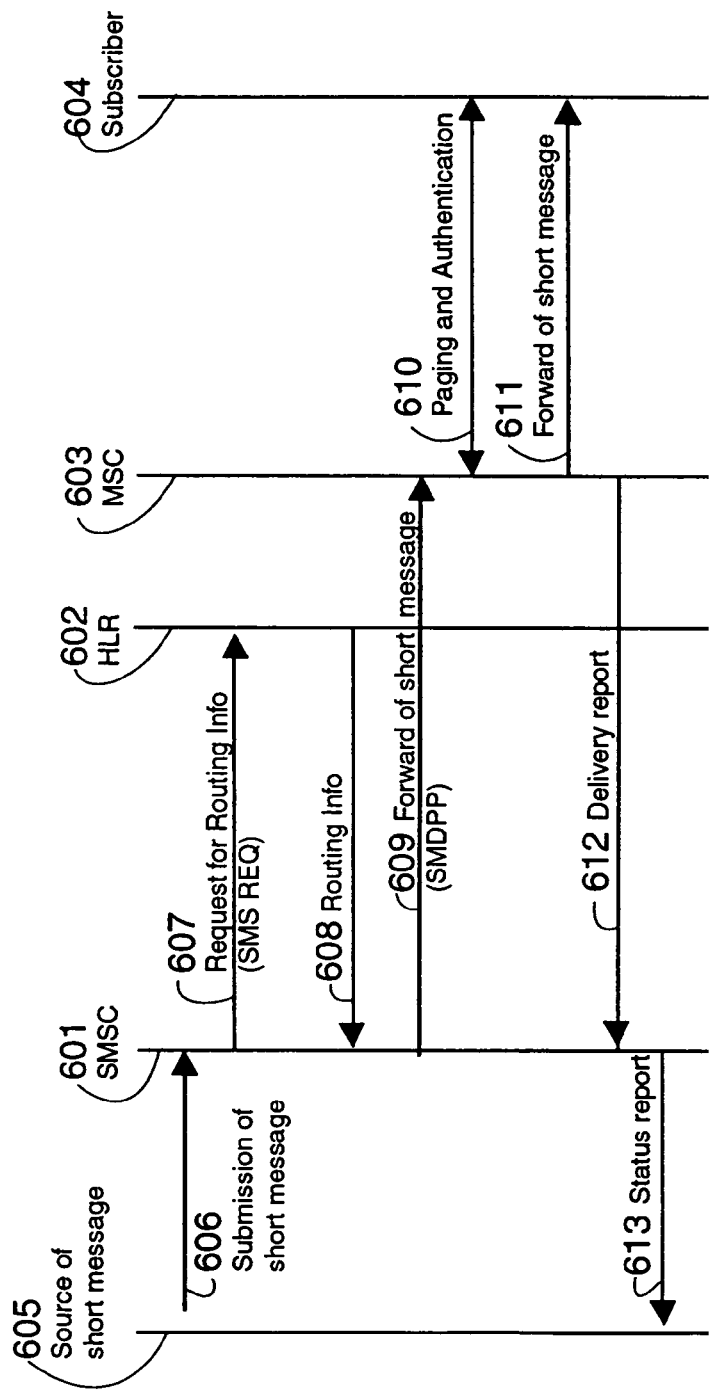
FIG. 6 shows an exemplary flow of a short message through a conventional SMS network.

FIGS. 4A to 4C show an exemplary application of interactive SMS menus wherein on-demand stock updates are provided in response to selection from a lower level menu, in accordance with the principles of the present invention.

For example, a carrier might define a menu consisting of: 1) News, 2) Sports, 3) Local Weather, 4) Games, and 5) Stocks. A subscriber can quickly navigate through SMS menus to reach the Stocks option, press 5, and the request will automatically be sent. The network may then return an SMS menu page asking the user to enter the stock ticker, or it can be set to provide the user with personalized stock ticker selections.

FIG. 4A shows another exemplary main menu. In the given example of FIGS. 4A-4C, assume that the subscriber or user of the mobile device 100 presses '3' in response to the main, static menu shown in FIG. 4A.

In return, the mobile device 100 would receive a second level, static menu, e.g., as shown in FIG. 4B. In this example, the response interactive SMS menu requests a stock ticker identifying symbol, and offers a ticker lookup option to simplify the user interface needs. In this case, the user might enter '2' '58' and send, with the '2' representing entry of a ticker to follow, '58' corresponding to the ticker LU (Lucent Technologies Inc.).

The relevant information server 150 would provide the relevant stock price information, and a third level dynamic 'menu' is transmitted to the mobile device 100 showing the exemplary information as in FIG. 4C. Further menu options may be provided as shown in FIG. 4C, and the fourth and lower level menus may be static (e.g., simply retrieved by address from the SMSC 120) or may be dynamically formed using retrieved information from an appropriate application program via the Internet.

The information may be sent using the mobile device's mobile originated capabilities (no WAP necessary or required) to an external server that processes the query and returns a result to the mobile device.

The flexibility of this feature can allow service providers to configure their own options at different menu levels, depending on existing/future service offerings. Moreover, this functionality allows mobile device and air interface transparency, as long as the mobile device (e.g., cellular phone) is CDMA (IS-637) or TDMA (IS-136a) Mobile Originated SMS compliant.

Interactive SMS menu services may be provided in either of two exemplary manners.

The first method utilizes a short message service center (SMSC) as simply a transport mechanism with an external short messaging entity (ESME) out in the TCP/IP network side providing all of the service. This may be accomplished, e.g., by defining entries to a message receive finite state machine (FSM) allowing the subscriber to address the particular ESME.

For instance, in a particular application, routing may be assisted by MO_Know (and/or MO_Dynamic) entries defined in a Msg_receive FSM allowing the subscriber to address the ESME. These entries may define a table used to signify destination addresses that equate to corresponding IP addresses, ports and connection on the Internet side. MO_Dynamic entries are similar to routing, but key off initial words or text in a text message, then appropriately routes the message to a menu application.

The second method utilizes an SMSC to generate a menu and responses transmitted to the mobile device. This may be accomplished by defining, e.g., a Menu_Fsm and a Menu_table.

As an exemplary implementation of the second method, a 4-digit address is selected to identify the particular menu to be addressed. Of course, fewer or more digits may be used to define the particular menu based on the needs of the particular application.

The menu address, e.g., the 4-digit address, may form a service address used by the subscriber to begin the menu dialog. For example, '6368' (menu) may form a parameter called, e.g., 'menu_key'. This is all that needs to be provisioned in a provisioning form, e.g., in a 'Menu_Fsm' provisioning form. The body of the feature may be defined within another provisioning form, e.g., within a 'Menu_table' provisioning form.

The MO_Know table form may also be provisioned with the menu address, e.g., with '6368' as 'index' and 'dest_index' fields, and a delivery method 'deliver_method' set to delivery via the SMSC, e.g., 'MO_smsc'. This allows mobile originated (MO) messages to be directed to the menu finite state machine 'Menu_Fsm' for processing.

To request a particular menu, the mobile originating subscriber initiates a message addressed to, e.g., '6368'. The menu request is preferably directed to the 'Menu_Fsm', and expanded to a length sufficient to include a digit for each menu selected through.

For instance, the 4-digit menu address may be expanded to allow for five (5) levels of menus by lengthening the menu address to a 9-digit routing string by appending 0's to the end. While 0's are used in this example, of course any suitable character (or characters) may be used to provide a 'null' value in the expanded version of the menu address.

In the given example, the resulting 'root' menu address is the 9-bit address '636800000', and this value is preferably defined in a Menu table form. In accordance with the principles of the present invention, a 'text' field preferably contains the text (menu options) that is to be returned to the subscriber. For example, a particular menu may include the text: "Select 1) Food 2) Drink".

The field is preferably limited to fit within an allotted display area, e.g., to 150 characters. Moreover, the text is preferably not formatted, to allow flexibility in the display of the particular mobile device.

If a user response is required by the SMS in response to the transmitted menu, a flag is set in the menu when transmitted to the mobile device. For instance, a 'menu_action' field may preferably be set to, e.g., a 'next_menu' parameter, thus requiring a user response to the received interactive SMS menu.

The mobile originated subscriber receives the 'text' and sends, e.g., a 1-digit response to the message (e.g., 0 to 9). This response is again directed to the menu finite state machine, e.g., 'Menu_Fsm', as '636800000', allowing return of a response code.

For example, assume the menu addressed by '6368' includes the text: "Select 1) Food 2) Drink, and that the user presses the '2' key to provide a '2' as the response code after having read the selections. The interactive SMS menu feature preferably replaces the first '0' in the expanded portion of the menu address with a non-zero or non-null response code. In the given example of a response of '2', a text message will be returned by the mobile device to the SMSC including a 'root' of 636820000.

The interactive SMS menu feature then looks for a matching 'root' entry to the new menu address '63682', and sends a corresponding new menu back to the mobile originated subscriber in SMS text form or replacement and display instead of the previous '6368' menu. In the given example, a menu addressed at '63682' may include text such as "1) Coffee 2) Tea 3) Juice 4) Soda 5) Water".

The mobile originated subscriber receives the replacement interactive SMS menu 'text', allowing for another 1-digit response by the user, which is again directed to the menu finite state machine 'Menu_Fsm'. For example, assume a '3' is the response code at this point. The interactive SMS menu feature preferably replaces the first '0' encountered with the response code, resulting in a new 'root' menu address of '636823000'.

This continues until a final menu selection has been made. If no additional user responses are required, then the response field (e.g., 'menu_action') in the SMS text message from the SMS to the mobile device may be set to, e.g., 'final'.

Provision for returning to a 'home' menu may be provided. For instance, a user response of, e.g., '0' or other null character may at any time cause the SMS to returns the main menu addressed at 636800000.

Preferably, each branch of the menu is provisioned as a separate entry into an appropriate menu table. Also preferably, the 'root' menu address preferably inherently contains the previous selections made by the user to reach the current level of text, e.g., 636823000 includes the selections of '2' and '3', through three levels of menus. While the principles of the present invention relate to menus having anywhere from just a couple to many, many levels, the length of the menu address inherently serves to limit the number of levels that the menuing may include. For instance, in the given example of expanding the menu address by five digits, five (5) levels of response menus (or 6 levels of menus) may be provided.

Interaction with an external ESME may be accomplished by provisioning an appropriate field, e.g., a 'menu_action' field as, e.g., 'rqst', and an auxiliary menu flag parameter, e.g., 'aux_menu_flag' to, e.g., 'TRUE' for that user selection. In the given example, this will result in a message 'aux_menu_string' being escalated over an SMPP port identified by 'aux_menu_counter'. The mobile originated subscriber's mobile identification number (MIN) is included in the SMPP message sent to the ESME. Once escalated, the ESME is responsible for sending messages (conformation) to the mobile originated subscriber.

This implementation allows the SMSC to handle a portion of the menu processing, with the ability to hand off the subscriber to a specific ESME depending on the subscriber's responses. The hand off may actually be a request for specific information or a request for delivery of an object (e.g., '3' juice').

Menus may be pushed down to the mobile device via SMSC and can be setup to allow for user responses. The response can be delivered back to the SMSC via Mobile Originated messaging and will trigger another menu to the handset allowing menus and interaction with external entities via TCP/IP.

The following service implementation description depicts a typical menuing scenario.

Scenario 1—Menuing
1. The first level menu is passed down to the mobile station. The message is passed down with a request for acknowledgement to the message.
2. The user can select a numeric acknowledgement to the menu.
3. The MO message is sent back to the SMSC in the form of a mobile originated short message.
4. The message response is received by the SMSC and is acted on by moving to the next level menu or to initiate a request via TCP/IP as appropriate for retrieval of information.
5. If a new menu is pushed down to the mobile station the message is sent requesting replacement of the previous message.
6. This message replacement allows for only one message ever to be stored on the handset, which defines the current level within then menu structure.
7. Every level of menuing allows the user to proceed to the next level of menus or to return to the previous level of menus. This allows the user to interactively move between menus.

In accordance with the principles of the present invention, a mobile device is provided with menu interfaces without requiring replacement of the mobile device with a WAP compliant mobile device and/or without entering a WAP 'browser mode'. Instead of requiring compliance with WAP protocols, the solution saves costs by utilizing an SMSC as the transport mechanism.

The user may 'walk' thru various levels of a menu, and stop at any desired level. Preferably, the user can pick-up at that level of the menu at any time without creating a new connection. With CSD (e.g., with WAP), this is not possible and a large portion of cost is derived in connection time to get started.

Thus, in accordance with the principles of the present invention, an SMSC includes the capability to interactively exchange messages with a mobile device. The SMSC is provided with the ability to detect a menu level of a subscriber, and to interact with the mobile device as appropriate, without the need for WAP protocol communications.

Content for the mobile device menus may be provided, e.g., by a suitable news source, such as www.usatoday.com.

Benefits of Interactive Menus include: (1) Handset and air interface transparency for TDMA (IS-136a), CDMA (IS-637), or GSM Mobile Originated SMS compliant handsets. (2) Easy personalization, customization, and configurability: users can "Pull" desired content on demand or set up their profile for scheduled delivery. (3) Immediately available for current networks using existing standard SMS capabilities. (4) Utilization of SMS packet-based services instead of circuit switched data (CSD), relieving network congestion and leaving traffic channels available for voice calls. (5) Utilization of less costly and more plentiful Mobile Originated handsets, versus specialized WAP handsets—though also compatible with WAP based servers and handsets. (6) Low implementation and operation costs with user self-provisioning—designed for easy offer to the masses.

One exemplary application making use of interactive SMS menus in accordance with the principles of the present invention is on-line gaming, where users can stay on-line for extended periods of time, and also interact with other players/subscribers.

Interactive SMS menu functionality has particular application in wireless carrier markets, Internet Service Providers markets, and/or Information content delivery services/provision markets.

While the invention has been described with reference to the exemplary embodiments thereof, those skilled in the art will be able to make various modifications to the described embodiments of the invention without departing from the true spirit and scope of the invention.

What is claimed is:

1. An interactive short messaging system menu selection process, comprising:
   receiving a second short messaging service (SMS) short message from a mobile device including an identification of a main menu requested to be transmitted to said mobile device, said identification of said requested main menu being a user presented option in a first SMS short message; and
   transmitting a third SMS short message to said mobile device including said requested main menu;
   wherein said first SMS short message, said second SMS short message, and said third SMS short message provide for interactive menu driven SMS short message communications in both directions between said mobile device and said destination device.

2. The interactive short messaging system menu selection process according to claim 1, further comprising:
   transmitting a replacement menu to said mobile device to replace text of a previous menu.

3. The interactive short messaging system menu selection process according to claim 1, wherein:
   said choice is a single digit choice.

4. The interactive short messaging system menu selection process according to claim 3, wherein:
   said single digit choice is non-zero.

5. The interactive short messaging system menu selection process according to claim 1, wherein:
   said SMS short of said main menu is unformatted for transmission to said mobile device.

6. The interactive short messaging system menu selection process according to claim 1, wherein:
   said mobile device is a cellular telephone.

7. The interactive short messaging system menu selection process according to claim 6, wherein:
   said cellular telephone is IS-41 compliant.

8. The interactive short messaging system menu selection process according to claim 6, wherein:
   said cellular telephone is GSM compliant.

9. Apparatus for selecting an interactive short messaging system menu, comprising:
   means for receiving a second short messaging service (SMS) short message from a mobile device including an identification of a main menu requested to be transmitted to said mobile device, said identification of said requested main menu being a user presented option in a first SMS short message; and
   transmitting a third SMS short message to said mobile device including said requested main menu;
   wherein said first SMS short message, said second SMS short message, and said third SMS short message provide for interactive menu driven SMS short message communications in both directions between said mobile device and said destination device.

10. The apparatus for selecting an interactive short messaging system menu according to claim 9, further comprising:
    means for transmitting a replacement menu to said mobile device to replace text of a previous menu in response to receipt of said choice corresponding to a selected further menu.

11. The apparatus for selecting an interactive short messaging system menu according to claim 9, wherein:
    said choice is a single digit choice.

12. The apparatus for selecting an interactive short messaging system menu according to claim 11, wherein:
    said single digit choice is non-zero.

13. The apparatus for selecting an interactive short messaging system menu according to claim 9, wherein:
    said means for transmitting a text message and said means for transmitting a text message each transmit unformatted text.

14. The apparatus for selecting an interactive short messaging system menu according to claim 9, wherein:
    said mobile device is a cellular telephone.

15. The apparatus for selecting an interactive short messaging system menu according to claim 14, wherein:
    said cellular telephone is IS-41 compliant.

16. The apparatus for selecting an interactive short messaging system menu selection process according to claim 14, wherein:
    said cellular telephone is GSM compliant.

17. An interactive menu selection short messaging system, comprising:
    a receiver to receive a second short messaging service (SMS) short message from a mobile device including an identification of a main menu requested to be transmitted to said mobile device, said identification of said requested main menu being a user presented option in a first SMS short message; and
    a transmitter to transmit a third SMS short message to said mobile device including said requested main menu;
    wherein said first SMS short message, said second SMS short message, and said third SMS short message provide for interactive menu driven SMS short message communications in both directions between said mobile device and said destination device.

18. The interactive menu selection short messaging system according to claim 17, further comprising:
    a transmitter to transmit a replacement menu to said mobile device, said replacement menu to replace text of a previous menu.

19. An interactive short messaging system menu selection process, comprising:
    transmitting a second short messaging service (SMS) short message from a mobile device, said second SMS short message including an identification of a main menu requested to be transmitted to said mobile device, and said identification of said requested main menu being a user presented option in a first SMS short message; and
    receiving a third SMS short message to said mobile device including said requested main menu;
    wherein said first SMS short message, said second SMS short message, and said third SMS short message provide for interactive menu driven SMS short message communications in both directions between said mobile device and said destination device.

20. The interactive short messaging system menu selection process according to claim 19, further comprising:
receiving a replacement menu at said mobile device to replace text of a previous menu.

21. The interactive short messaging system menu selection process according to claim 19, wherein:
said text of said main menu is unformatted for receipt at said mobile device.

* * * * *